(12) United States Patent
Barzik et al.

(10) Patent No.: US 9,798,474 B2
(45) Date of Patent: Oct. 24, 2017

(54) SOFTWARE-DEFINED STORAGE SYSTEM MONITORING TOOL

(71) Applicant: INTERNATIONAL BUSINESS MACHINES CORPORATION, Armonk, NY (US)

(72) Inventors: Zah Barzik, Rishon Lezion (IL); Yaacov Frank, Houston, TX (US); Tomer Goldberg, Givataim (IL); Amit Margalit, Hod-Hasharon (IL); Rivka M. Matosevich, Zichron-Ya'acov (IL); Osnat Shasha, Holon (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/865,539

(22) Filed: Sep. 25, 2015

(65) Prior Publication Data
US 2017/0090779 A1    Mar. 30, 2017

(51) Int. Cl.
*G06F 12/00* (2006.01)
*G06F 3/06* (2006.01)
(Continued)

(52) U.S. Cl.
CPC ............ *G06F 3/0613* (2013.01); *G06F 3/065* (2013.01); *G06F 3/067* (2013.01); *G06F 3/0608* (2013.01);
(Continued)

(58) Field of Classification Search
CPC ....... G06F 3/0613; G06F 3/067; G06F 3/0653
See application file for complete search history.

(56) References Cited

U.S. PATENT DOCUMENTS 6,985,937 B1 * 1/2006 Keshav ................ G06F 9/5077
370/231
7,197,014 B2   3/2007 Katsuyama et al.
(Continued)

FOREIGN PATENT DOCUMENTS

WO    02089014 A1    11/2002

OTHER PUBLICATIONS

Liu, "Development of TOSCA Service Templates for provisioning portable IT Services", 77 pages, Diploma Thesis, Institute of Parallel and Distributed Systems, University of Stuttgart.
(Continued)

*Primary Examiner* — Mark Giardino, Jr.
(74) *Attorney, Agent, or Firm* — GRIFFITHS & SEATON PLLC (57) ABSTRACT

Methods, computing systems and computer program products implement embodiments of the present invention that include collecting, from a software-defined storage system including one or more computing nodes that are configured to provide a storage service, performance metrics for each of the computing nodes, and detecting, based on the performance metrics, a performance bottleneck in the software-defined storage system. In embodiments of the present invention, each of the computing nodes includes one or more software modules and one or more hardware components, and the performance bottleneck is either a given software module or a given hardware component. In some embodiments, detecting the performance bottleneck includes predicting the performance bottleneck. Upon detecting the performance bottleneck, a solution for the performance bottleneck can be determined, and the performance bottleneck and the solution can be presented to a user on a display.

20 Claims, 5 Drawing Sheets

(51) Int. Cl.
*G06F 13/00* (2006.01)
*G06F 13/28* (2006.01)

(52) U.S. Cl.
CPC .......... *G06F 3/0619* (2013.01); *G06F 3/0641* (2013.01); *G06F 3/0653* (2013.01)

(56) References Cited

U.S. PATENT DOCUMENTS

| | | | |
|---|---|---|---|
| 7,203,944 B1 * | 4/2007 | van Rietschote | G06F 9/45533 718/1 |
| 7,765,256 B2 | 7/2010 | Doshi et al. | |
| 8,065,660 B1 | 11/2011 | Tanner et al. | |
| 8,150,037 B2 | 4/2012 | Luk et al. | |
| 8,291,416 B2 | 10/2012 | Cartales | |
| 8,793,377 B2 | 7/2014 | Anderson, III et al. | |
| 8,954,587 B2 * | 2/2015 | Gusak | G06F 9/505 709/226 |
| 9,047,136 B2 | 6/2015 | Thanga et al. | |
| 9,172,713 B2 | 10/2015 | Joffe et al. | |
| 9,319,300 B2 | 4/2016 | Huynh Van et al. | |
| 9,569,233 B2 | 2/2017 | Masters et al. | |
| 9,582,209 B2 | 2/2017 | Shih et al. | |
| 9,648,004 B2 | 5/2017 | Joffe et al. | |
| 2002/0145978 A1 | 10/2002 | Batsell et al. | |
| 2002/0194324 A1 * | 12/2002 | Guha | H04L 12/2602 709/223 |
| 2006/0069761 A1 * | 3/2006 | Singh | H04L 67/1008 709/222 |
| 2008/0141264 A1 * | 6/2008 | Johnson | G06F 9/455 718/105 |
| 2009/0168645 A1 | 7/2009 | Tester et al. | |
| 2009/0172666 A1 * | 7/2009 | Yahalom | G06F 3/0605 718/1 |
| 2010/0269109 A1 * | 10/2010 | Cartales | G06F 9/5072 718/1 |
| 2013/0297907 A1 | 11/2013 | Ki et al. | |
| 2014/0047342 A1 | 2/2014 | Breternitz et al. | |
| 2014/0115579 A1 | 4/2014 | Kong | |
| 2014/0201425 A1 | 7/2014 | Clark et al. | |
| 2014/0215465 A1 | 7/2014 | Elzur | |
| 2014/0280488 A1 | 9/2014 | Voit et al. | |
| 2014/0310434 A1 | 10/2014 | Strange et al. | |
| 2014/0351809 A1 | 11/2014 | Chawla et al. | |
| 2014/0379894 A1 | 12/2014 | Allen et al. | |
| 2015/0071123 A1 | 3/2015 | Sabaa | |
| 2015/0081893 A1 | 3/2015 | Chadwell et al. | |
| 2015/0135185 A1 | 5/2015 | Sirota et al. | |
| 2015/0222696 A1 | 8/2015 | Park et al. | |
| 2016/0006756 A1 | 1/2016 | Ismael et al. | |

OTHER PUBLICATIONS

"Integral Single Document Storage and Retrieval Guide", p. 37, Integral SDS Procedures and Guidelines for Image Services, Release 4.1.2, Nov. 2008.
Darsana, "Integrating Cloud Service Deployment Automation with Software Defined Environments", 71 pages, Institute of Parallel and Distributed Systems, University of Stuttgart, 2014.
"Realizing the benefits of software-defined storage: an EMC perspective", 5-7, EMC White Paper, Sep. 2013.
Kalantar et al., "Weaver: Language and Runtime for Software Defined Environments", 13 pages, IBM Journal of Research and Development 58, No. 2/3, 2014.
"Software-Defined Storage and VMware's Virtual San Redefining Storage Operations" p. 2, The TANEJA Group, Inc. 2014Hopkinton, MA.
"VMware-Perspective-on-software-defined-storage-white-paper" pp. 6, 7, 11, 15, White Paper.

\* cited by examiner

SOFTWARE-DEFINED STORAGE SYSTEM MONITORING TOOL

FIELD OF THE INVENTION

The present invention relates generally to software-defined storage, and specifically to a method for identifying and correcting performance bottlenecks in a software-defined storage system.

BACKGROUND

In a software-defined storage (SDS) system, storage hardware is separated from software that manages the storage infrastructure. In SDS, the software managing a software-defined storage environment may also provide policy management for features such as deduplication, replication, thin provisioning, snapshots and backup. By definition, SDS software is separate from the hardware it is managing, and can be implemented via appliances over a traditional Storage Area Network (SAN), or implemented as part of a scale-out Network-Attached Storage (NAS) solution, or as the basis of an Object-based storage solution.

The description above is presented as a general overview of related art in this field and should not be construed as an admission that any of the information it contains constitutes prior art against the present patent application.

SUMMARY

There is provided, in accordance with an embodiment of the present invention a method, including collecting, from a software-defined storage system including one or more computing nodes that are configured to provide a storage service, performance metrics for each of the computing nodes, detecting, based on the performance metrics, a performance bottleneck in the software-defined storage system, determining a solution for the performance bottleneck, and presenting, to a user, the performance bottleneck and the solution.

There is also provided, in accordance with an embodiment of the present invention a computing facility, including one or more computing nodes configured as a software-defined storage system that are arranged to provide a storage service, and a computer coupled to the one or more computing nodes and configured to collect, from the software-defined storage system, performance metrics for each of the computing nodes, to detect, based on the performance metrics, a performance bottleneck in the software-defined storage system, to determine a solution for the performance bottleneck, and to present, to a user, the performance bottleneck and the solution.

There is further provided, in accordance with an embodiment of the present invention a computer program product, the computer program product including a non-transitory computer readable storage medium having computer readable program code embodied therewith, the computer readable program code including computer readable program code configured to collect, from a software-defined storage system including one or more computing nodes that are configured to provide a storage service, performance metrics for each of the computing nodes, computer readable program code configured to detect, based on the performance metrics, a performance bottleneck in the software-defined storage system, computer readable program code configured to determine a solution for the performance bottleneck, and computer readable program code configured to present, to a user, the performance bottleneck and the solution.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide systems and methods for monitoring a software-defined storage (SDS) system in order to detect any performance bottlenecks, and to recommend solutions to the detected performance bottlenecks. As described hereinbelow, performance metrics are collected from a software-defined storage system comprising one or more computing nodes that are configured to provide a storage service, and based on the performance metrics, a performance bottleneck is detected in the software-defined storage system. Upon detecting the performance bottleneck, a solution for the performance bottleneck can be determined, and the performance bottleneck and the solution can be presented to a user.

In embodiments described herein, a monitoring tool comprising one or more software modules can be deployed and configured to monitor input/output (I/O) traffic generated by the SDS system. In some embodiments, performance goals can be set for the SDS system, and the monitoring tool can measure SDS system performance with regard to the performance goals. Examples of SDS system performance goals include, but are not limited to, I/O performance goals, resource availability goals, and resource optimization goals. In additional embodiments, the monitoring tool can measure performance of individual hardware and/or software components of the SDS system while the SDS system provides a file services.

As described hereinbelow, monitoring tools implementing embodiments of the present invention can, based on a user request, monitor performance of specific hardware and/or software components of the SDS system. In operation, the monitoring tool can generate, for each of the specific components, respective scores indicating current performance of the components. Additionally, the monitoring tool can convey recommendations on how to increase the scores. Examples of recommendations include allocating more processor or memory resources to a virtual machine (VM) in the SDS system, and allocating more network bandwidth to the SDS system.

Monitoring tools implementing embodiments of the present invention can present suggestions for optimizing configurations of SDS systems in order to (a) reduce a chance of a single point of failure (e.g. a loss of service or connectivity), (b) ensure optimal utilization of hardware and/or software resources (e.g., processor, memory, storage, network bandwidth, etc.), and (c) ensure that user-defined performance objectives are met. For example, in an enterprise SDS system, monitoring tools implementing embodiments of the present invention can ensure that the appropriate types (e.g., solid-state disks) and sizes of storage device are assigned to the SDS.

Figure 1:
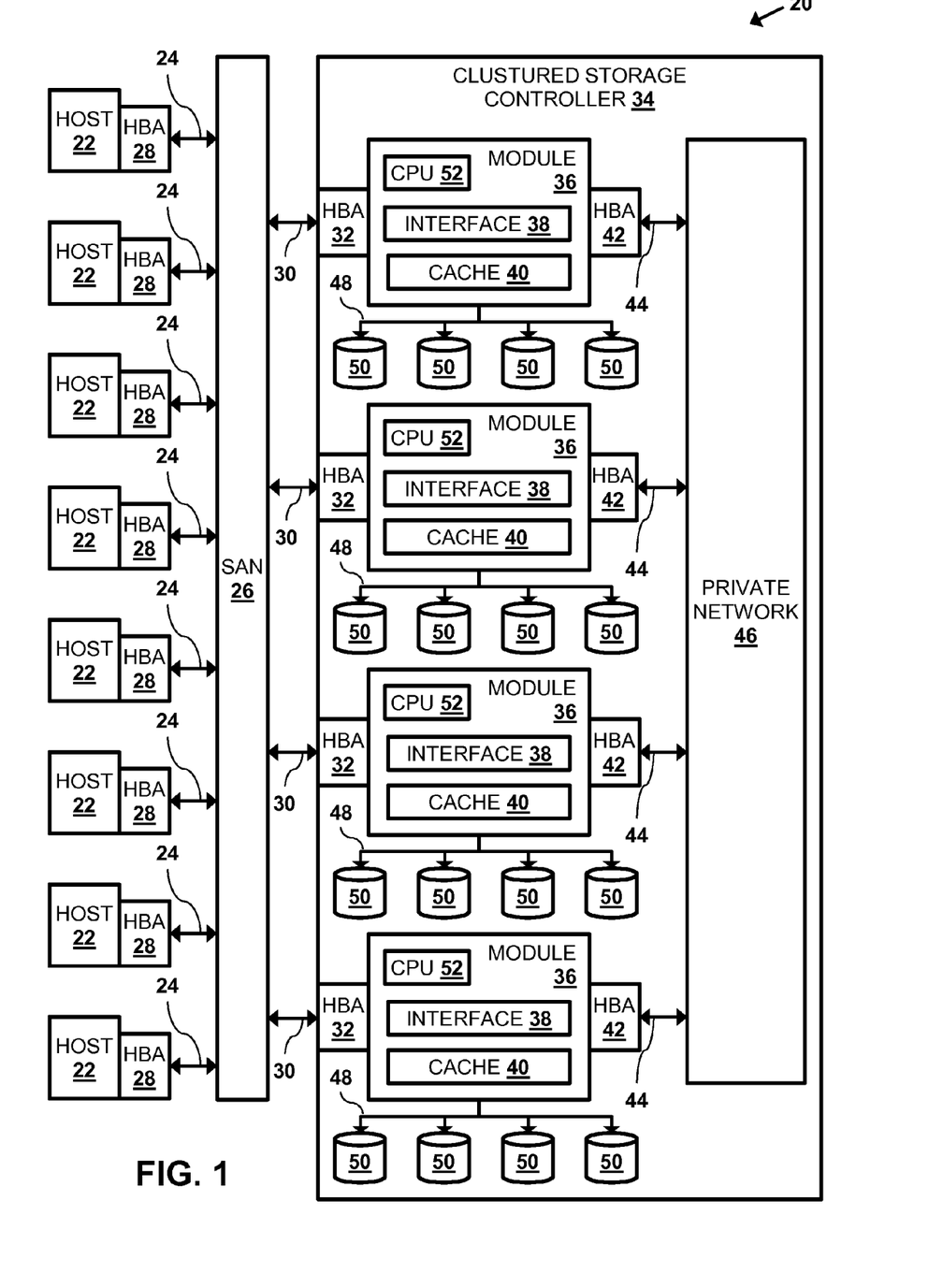
FIG. 1 is a block diagram that schematically illustrates a storage system comprising a storage controller configured to deploy and monitor a software-defined storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 40 (in communication between adapters 32 and 42), and a cache 38. Each storage module 36 is responsible for a number of storage devices 50 by way of a data connection 48 as shown.

As described previously, each storage module 36 further comprises a given cache 38. However, it will be appreciated that the number of caches 38 used in storage subsystem 20 and in conjunction with clustered storage controller 34 may be any convenient number. While all caches 38 in storage subsystem 20 may operate in substantially the same manner and comprise substantially similar elements, this is not a requirement. Each of the caches 38 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 38 coupled to respective sets of storage devices 50. In some configurations, the sets of storage devices 50 comprise one or more hard disks, or solid state drives (SSDs) which can have different performance characteristics. In response to an I/O command, a given cache 38, by way of example, may read or write data at addressable physical locations of a given storage device 50. In the embodiment shown in FIG. 1, caches 38 are able to exercise certain control functions over storage devices 50. These control functions may alternatively be realized by hardware devices such as disk controllers (not shown), which are linked to caches 38.

Each storage module 36 is operative to monitor its state, including the states of associated caches 38, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 38 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller 34 comprising any multiple of modules 36 coupled to any plurality of storage devices 50 is considered to be with the spirit and scope of the present invention.

Figure 2:
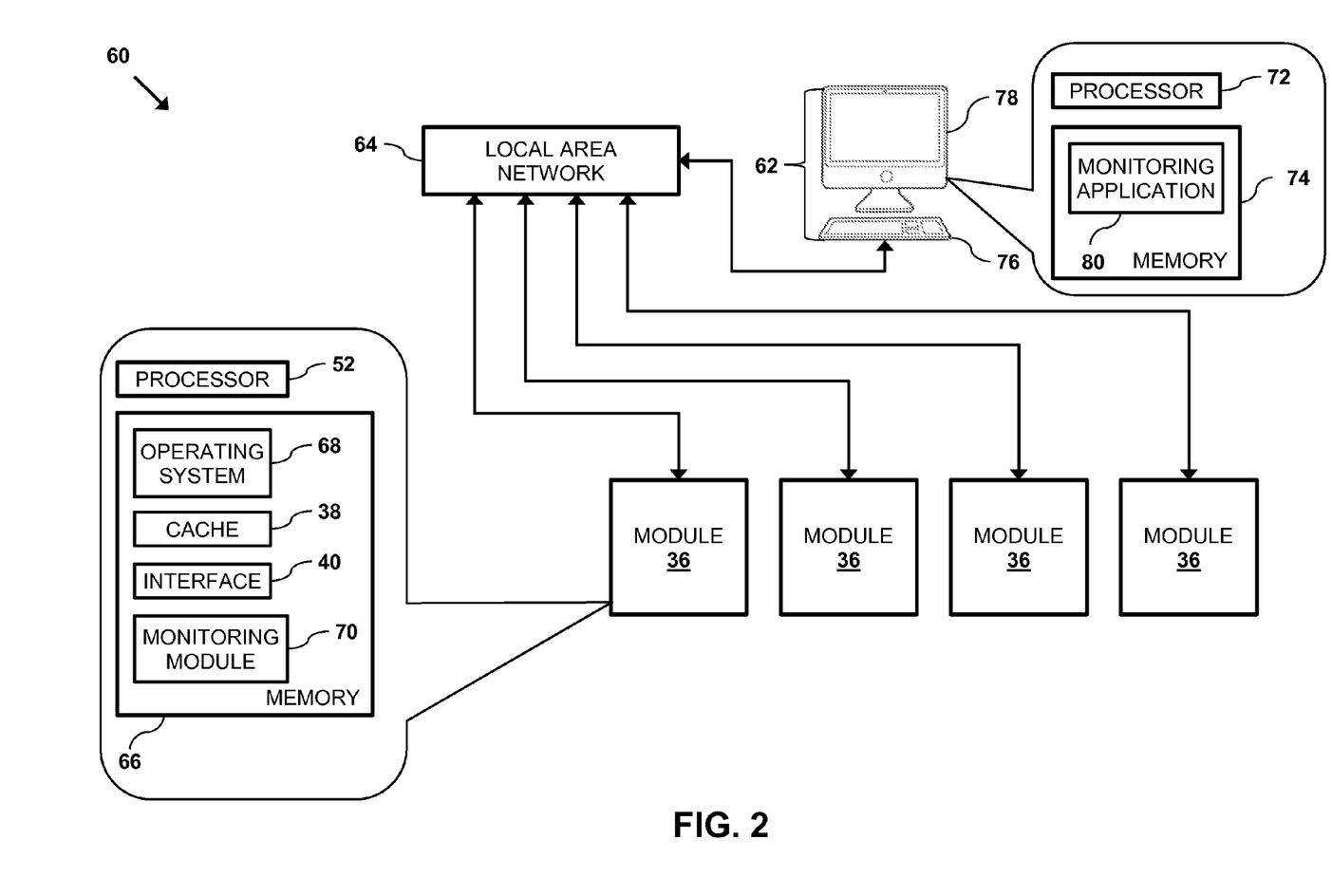
FIG. 2 is a block diagram that schematically illustrates a first configuration of a computing facility configured to monitor the software-defined storage system, in accordance with an embodiment of the present invention.

FIG. 2 is a block diagram that schematically illustrates a first configuration of a computing facility 60 comprising a computer 62 configured to monitor a software-defined storage system having multiple computing nodes comprising modules 36 of storage controller 34, in accordance with an embodiment of the present invention. In the configuration shown in FIG. 2, facility 60 comprises computer 62 coupled to modules 36 via a data network such as local area network (LAN) 64, and the computing nodes of the SDS system are implemented directly on hardware components of modules 36 (i.e., on "bare-metal servers" without any hardware abstraction). In some embodiments, modules 36 can access LAN 64 via private network 46.

Each given module 36 comprises processor 52 (also referred to herein as a module processor) and a module memory 66 configured to store cache 38, interface 40, an operating system 68, and a monitoring module 70 that is configured to monitor the hardware and software components in given module that is used (i.e., either directly or indirectly) by the SDS system. In the configuration shown in FIG. 2 (and in FIGS. 3 and 4 described hereinbelow), the SDS system implemented in facility 60 comprises a software-defined storage (SDS) system that comprising cache 38 and interface 40 that provides file services to host computers 22.

Computer 62 comprises a monitoring processor 72, a monitoring memory 74 that stores cache 38 and interface 40, a keyboard 76 and a display 78. In operation, processor 72 executes, from memory 74, a monitoring application 80 that collects performance metrics from monitoring modules 70, and presents, on display 78 a status of the SDS system. In alternative embodiments the SDS system may comprise an application programming interface (API) that monitoring application 80 can access in order to directly access (i.e., without monitoring modules 70) performance metrics of hardware and software components of the SDS system. Monitoring application 80 is described in further detail hereinbelow. In further embodiments, the collecting, the analyzing, and the reporting functionality of monitoring application 80 can be implemented in monitoring modules 70.

Figure 3:
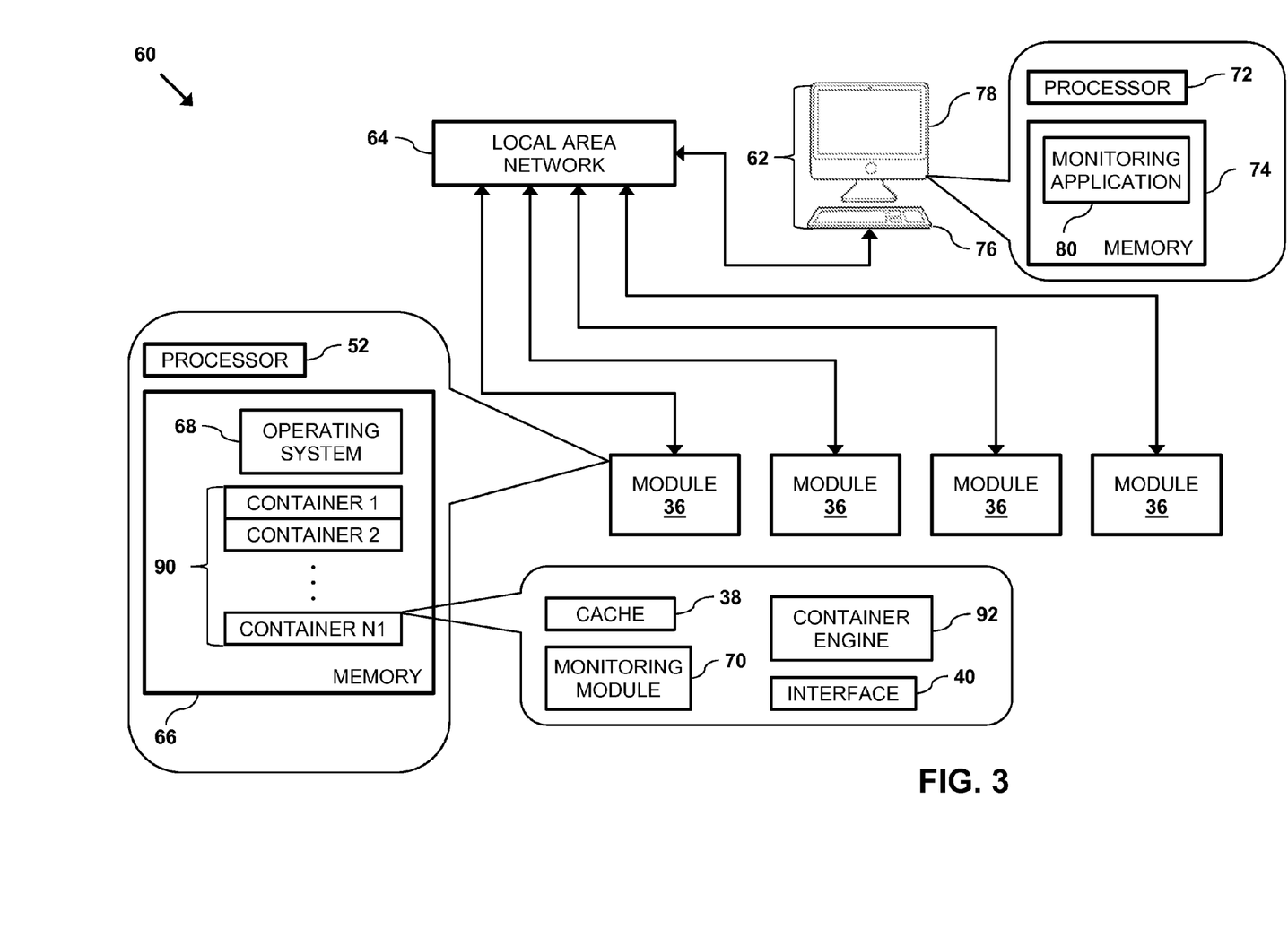
FIG. 3 is a block diagram that schematically illustrates a second configuration of a computing facility configured to monitor the software-defined storage system, in accordance with an embodiment of the present invention.

FIG. 3 is a block diagram that schematically illustrates a second configuration of computing facility 60, in accordance with a second embodiment of the present invention. In the configuration shown in FIG. 3, the computing nodes of the SDS system are implemented via software containers 90 executing in modules 36, each of the containers comprising a respective instance of cache 38, interface 40 and a software container engine 92 that manages execution of a given cache 38 and a given interface 40 using a given operating system 68 executing directly on a given processor 52 in a given module 36.

In embodiments where caches 38 and interfaces 40 execute within software containers 90, monitoring module 70 can also be configured to monitor performance metrics of the software containers. Additionally, in embodiments where the SDS system comprises an application programming interface (API) that monitoring application 80 can access in order to access performance metrics of hardware and software components of the SDS system, the API enables the monitoring application to access and monitor performance metrics of the software containers.

Figure 4:
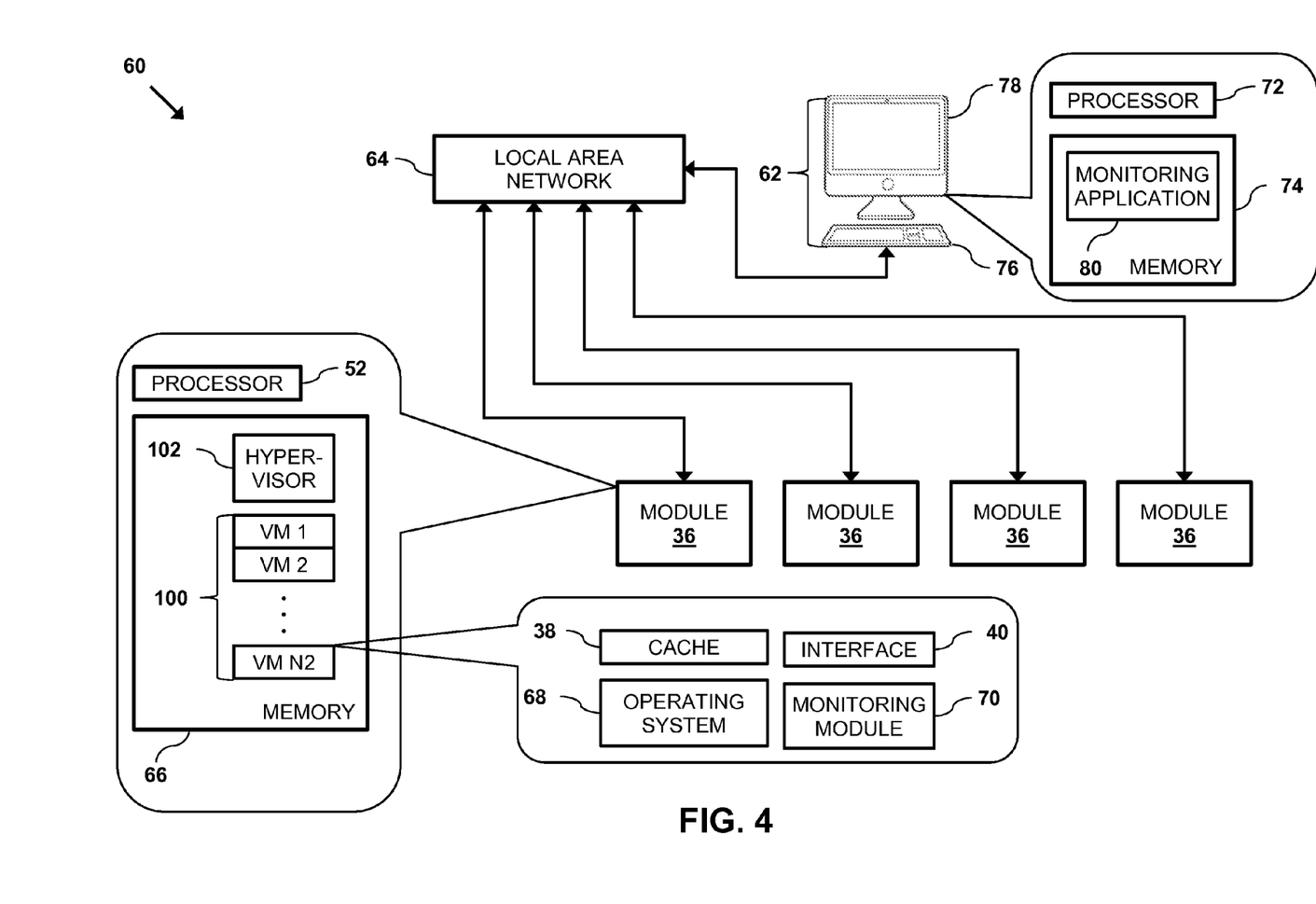
FIG. 4 is a block diagram that schematically illustrates a third configuration of a computing facility configured to monitor the software-defined storage system, in accordance with an embodiment of the present invention.

FIG. 4 is a block diagram that schematically illustrates a third configuration of computing facility 60, in accordance with a second embodiment of the present invention. In the configuration shown in FIG. 4, the computing nodes of the SDS system are implemented in a respective virtual machines (VMs) 100 executing on a hypervisor 102 in each module 36, each of the virtual machines comprising a respective instance of operating system 68 (i.e., executing within its respective virtual machine), cache 38, interface 40 and monitoring module 70.

In embodiments where caches 38 and interfaces 40 execute within virtual machines 100, monitoring module 70 can also be configured to monitor performance metrics of the virtual machines. Additionally, in embodiments where the SDS system comprises an application programming interface (API) that monitoring application 80 can access in order to access performance metrics of hardware and software components of the SDS system, the API enables the monitoring application to access and monitor performance metrics of virtual machines 100.

In operation, monitoring modules 70 can be activated during the time host I/O traffic is served by the SDS system. In some embodiments, a user (not shown) can control activation of the monitoring modules. In other words, monitoring modules 70 may be activated on a consistent manner or based on a user request.

In embodiments where the user controls activation of monitoring modules 70, the user can identify (i.e., prior to activation) SDS requirements that are to be monitored (e.g., storage capacity, SDS system performance etc.). When activated, monitoring modules 70 can start collecting performance metrics regarding the SDS system activity. Examples of performance metrics that monitoring modules 70 can collect include, but are not limited to, storage device latency, I/O latency, TCP connection performance, hypervisor processor & memory utilization, SDS system VM processor & memory utilization, and network latency, loss and delay. The collected performance metrics (i.e., statistics may be based on the real I/O traffic or may be based on synthetic low bounded traffic (e.g. for measuring network latency, loss and delay).

In some embodiments, monitoring application 80 can identify performance bottlenecks by calculating a score indicating an ability of the SDS system to achieve performance goals received from a user (e.g., via keyboard 76). Monitoring application 80 may calculate a single score (e.g. for the entire SDS system) or may calculate several different scores, wherein each of the scores is for one for a given performance goal or a group of performance goals (e.g. for I/O performance, resource availability and resource optimization).

In embodiments where monitoring application 80 calculates one or more scores, a higher score for a function that is associated with a given performance goal typically indicates that the SDS system is performing the given function without any performance bottlenecks, and a lower score for the given function can indicate a performance bottleneck.

In additional embodiments, monitoring application 80 can determine, based on a given calculated score, a visual effect, a present, on display 78, the a the given calculated score using the determined visual effect. Examples of visual effects include, but are not limited to, colors, intensities and "blinking". For example, monitoring application 80 can present score within in a low range in red, present scores within a medium range in yellow, and present scores within a high range in green.

Based on the received scores, the user may request to receive, from monitoring application 80, recommendations for potential changes to the SDS system configuration which may raise the system score(s). The recommendations may be hardware-related to correct a performance bottleneck due to the current hardware configuration (e.g., storage device or network infrastructure configurations) or software-related to correct a performance bottleneck due to the current software configuration (e.g., hypervisor or software container configurations).

For example, monitoring application 80 may recommend, based on any detected performance bottlenecks, to add additional storage devices 50, to add more modules 36, to add more processor 52 or memory 66 resources to VMs 100, to add an SSD to the SDS that the SDS can use to store and/or to cache data, to solve network impairments by using a different virtual LAN configuration or increase bandwidth on the LAN. In some embodiments, monitoring application 80 can be configured to predict an impact on the scores if some or all the recommendations are adopted.

In operation, the user may choose to implement part or all recommendations and re-run monitoring application 80 in order to calculate new scores. For example, monitoring application 80 can calculate an I/O latency score by collecting I/O latency for each I/O operation, collecting processor 52 utilizations, collecting cache 38 hit rates, collecting network latency (etc.), and analyzing the collected measurements (either off-line or on-line). In some embodiments, separate scores can be calculated (e.g., the I/O latency score described supra) and combined into an overall SDS system score.

In the examples shown in FIGS. 2-4, each of the computing nodes (i.e., implemented in modules 36) of the SDS system comprises a given instance of cache 38 and a given instance interface 40. In the example shown in FIG. 2, each of the computing nodes comprises a given module 36 (i.e., the cache and the interface are executing on a "bare metal" system), in the example shown in FIG. 3, each of the computing nodes comprises a given software container 90, and in the example shown in FIG. 4, each of the computing nodes comprises a given virtual machine 100.

While FIGS. 2-4 show the SDS system having the computing nodes deployed on modules 36 of storage controller 34, deploying the SDS system's computing nodes on other configurations of networked computers is considered to be within the spirit and scope of the present invention. In additional embodiments, the SDS system can be deployed using a combination of the configurations shown in FIGS. 2-4. For example, the SDS system can be implemented as a combination of software containers 90 and virtual machines 100 deployed in modules 36.

Processors 52 and 72 comprise general-purpose central processing units (CPU) or special-purpose embedded processors, which are programmed in software or firmware to carry out the functions described herein. The software may be downloaded to modules 36 and computer 62 in electronic form, over a network, for example, or it may be provided on non-transitory tangible media, such as optical, magnetic or electronic memory media. Alternatively, some or all of the functions of processor 52 and 72 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Real-Time SDS System Monitoring

Figure 5:
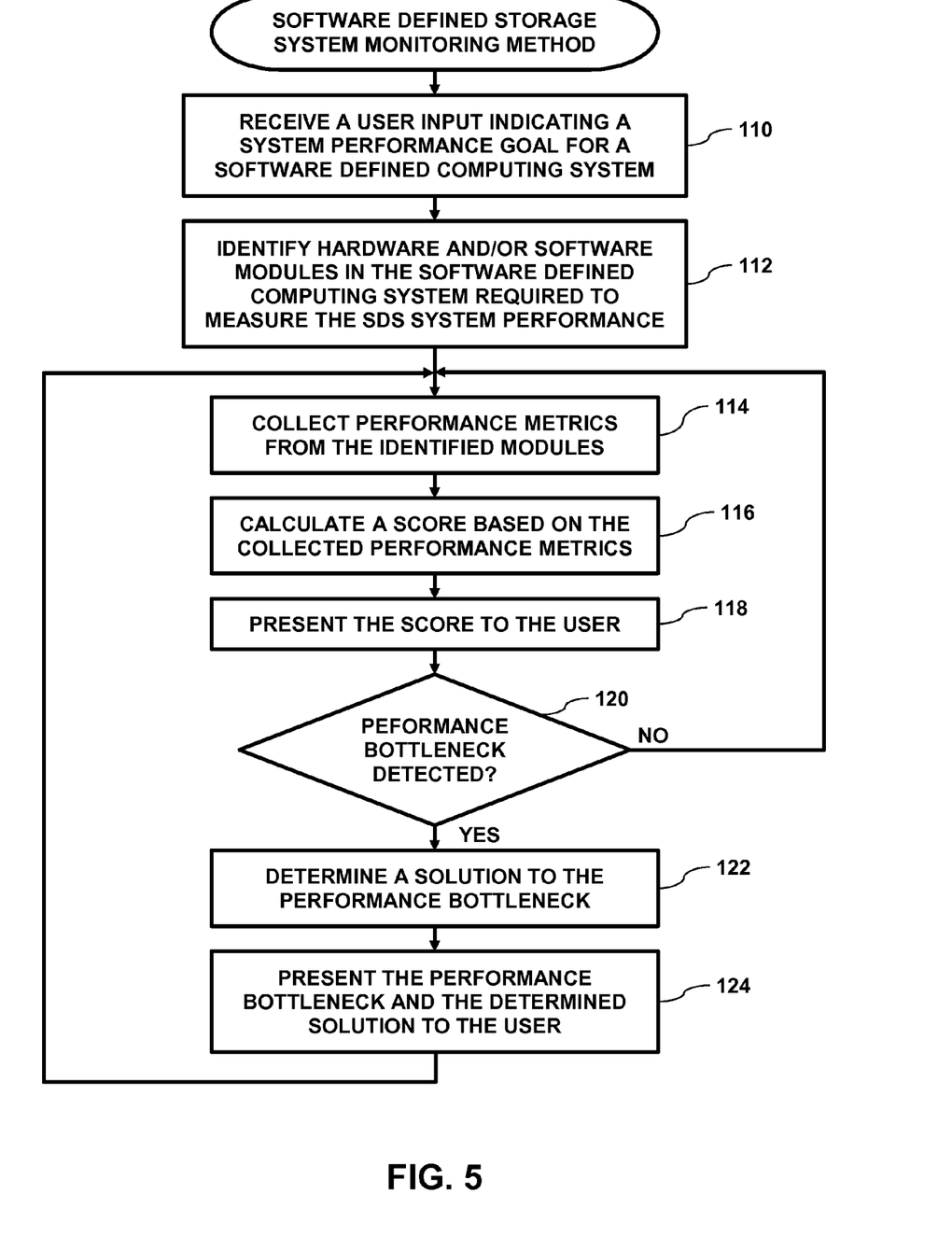
FIG. 5 is a flow diagram that schematically illustrates a method of monitoring the software-defined storage system, in accordance with an embodiment of the preset invention.

FIG. 5 is a flow diagram that schematically illustrates a method of monitoring a software-defined storage system, in accordance with an embodiment of the present invention. In a receive step 110, monitoring application 80 receives, from keyboard 76, an input indicating a system performance goal for the SDS system executing on modules 36, and in an identification step 112, the monitoring application identifies hardware components and/or software modules (e.g., a given processor 52 or a given instance of cache 38) in the SDS system that are required to measure the SDS system performance.

In a collection step 114, monitoring application 80 collects, from one or more monitoring modules 70, performance metrics for the identified hardware components and/or software modules, and in a calculation step 116, the monitoring application calculates a score based on the collected performance metrics. In a first presentation step 118, monitoring application 80 presents the calculated score on display 78.

In a comparison step 120, if the calculated score indicates a performance bottleneck (i.e., monitoring application 80 detects the performance bottleneck) in one or more of the identified modules, then monitoring application 80 determines a solution to the bottleneck in a determination step 122, presents (i.e., on display 78) the performance bottleneck and the determined solution in a second presentation step 124, and the method continues with step 114. Returning to step 120, if the if the calculated score does not indicate a performance bottleneck in one or more of the identified modules, then the method continues with step 114.

In embodiments of the present invention, monitoring application 80 detects the performance bottleneck by predicting, based on the collected performance metrics (and/or the calculated score), that the performance bottleneck will occur at a subsequent time (i.e., in the future). In some embodiments, monitoring application 80 can estimate when the performance bottleneck will occur and present the estimate on display 78. Therefore, when presenting the solution on display 78, monitoring application 80 can indicate when the solution should be implemented (i.e., either right away or at the subsequent time).

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   collecting, from a software-defined storage system comprising one or more computing nodes that are configured to provide a storage service, performance metrics for each of the computing nodes; wherein the performance metrics collected include at least storage device latency, input/output (I/O) latency, transmission control protocol (TCP) connection performance, hypervisor processor and memory utilization, virtual machine (VM) processor and memory utilization, and network latency, packet loss and delay;
   detecting, based on the performance metrics, a performance bottleneck in the software-defined storage system;
   determining a solution for the performance bottleneck, the solution including at least one of allocating additional processors or memory to a given computing node and allocating additional network bandwidth to the software-defined storage system; and
   presenting, to a user, the performance bottleneck and the solution.

2. The method according to claim 1, wherein detecting the performance bottleneck comprises predicting the performance bottleneck.

3. The method according to claim 1, wherein each of the computing nodes is selected from a group consisting of a bare metal system, a software container and a virtual machine.

4. The method according to claim 1, wherein a given computing node comprises one or more software modules executing on a computer system, and wherein detecting the performance bottleneck in the software-defined storage system comprises detecting the performance bottleneck in the one or more software modules.

5. The method according to claim 1, wherein a given computing node comprises multiple hardware components, and wherein detecting the performance bottleneck in the software-defined storage system comprises detecting the performance bottleneck in one or more of the hardware components.

6. The method according to claim 1, wherein presenting the performance bottleneck comprises calculating a score based on the performance metrics, and presenting the score to the user.

7. The method according to claim 6, and comprising receiving an input from the user identifying one or more of the performance metrics, and wherein calculating the score based on the performance metrics comprises calculating the score based on the one or more identified performance metrics.

8. A computing facility, comprising:
one or more computing nodes configured as a software-defined storage system that are arranged to provide a storage service; and
a computer coupled to the one or more computing nodes and configured:
to collect, from the software-defined storage system, performance metrics for each of the computing nodes; wherein the performance metrics collected include at least storage device latency, input/output (I/O) latency, transmission control protocol (TCP) connection performance, hypervisor processor and memory utilization, virtual machine (VM) processor and memory utilization, and network latency, packet loss and delay,
to detect, based on the performance metrics, a performance bottleneck in the software-defined storage system,
to determine a solution for the performance bottleneck, the solution including at least one of allocating additional processors or memory to a given computing node and allocating additional network bandwidth to the software-defined storage system, and
to present, to a user, the performance bottleneck and the solution.

9. The computing facility according to claim 8, wherein the computer is configured to detect the performance bottleneck by predicting the performance bottleneck.

10. The computing facility according to claim 8, wherein each of the computing nodes is selected from a group consisting of a bare metal system, a software container and a virtual machine.

11. The computing facility according to claim 8, wherein a given computing node comprises one or more software modules executing on a computer system, and wherein the computer is configured to storage the performance bottleneck in the software-defined storage system by detecting the performance bottleneck in the one or more software modules.

12. The computing facility according to claim 8, wherein a given computing node comprises multiple hardware components, and wherein the computer is configured to detect the performance bottleneck in the software-defined storage system by detecting the performance bottleneck in one or more of the hardware components.

13. The computing facility according to claim 8, wherein the computer is configured to present the performance bottleneck by calculating a score based on the performance metrics, and presenting the score to the user.

14. The computing facility according to claim 13, wherein the computer is configured to receiving an input from the user identifying one or more of the performance metrics, and wherein the computer is configured to calculate the score based on the performance metrics by calculating the score based on the one or more identified performance metrics.

15. A computer program product, the computer program product comprising:
a non-transitory computer readable storage medium having computer readable program code embodied therewith, the computer readable program code comprising:
computer readable program code configured to collect, from a software-defined storage system comprising one or more computing nodes that are configured to provide a storage service, performance metrics for each of the computing nodes; wherein the performance metrics collected include at least storage device latency, input/output (I/O) latency, transmission control protocol (TCP) connection performance, hypervisor processor and memory utilization, virtual machine (VM) processor and memory utilization, and network latency, packet loss and delay;
computer readable program code configured to detect, based on the performance metrics, a performance bottleneck in the software-defined storage system;
computer readable program code configured to determine a solution for the performance bottleneck, the solution including at least one of allocating additional processors or memory to a given computing node and allocating additional network bandwidth to the software-defined storage system; and
computer readable program code configured to present, to a user, the performance bottleneck and the solution.

16. The computer program product according to claim 15, wherein the computer readable program code is configured to detect the performance bottleneck by predicting the performance bottleneck.

17. The computer program product according to claim 15, wherein each of the computing nodes is selected from a group consisting of a bare metal system, a software container and a virtual machine.

18. The computer program product according to claim 15, wherein a given computing node comprises one or more software modules executing on a computer system comprising multiple hardware components, and wherein the computer readable program code is configured to detect the performance bottleneck in the software-defined storage system by detecting the performance bottleneck in a location selected from a group consisting of a given software module and a given hardware component.

19. The computer program product according to claim 15, wherein the computer readable program code is configured to present the performance bottleneck by calculating a score based on the performance metrics, and presenting the score to the user.

20. The computer program product according to claim 19, and comprising computer readable program code configured to receive an input from the user identifying one or more of the performance metrics, and wherein the computer readable program code is configured to calculate the score based on the performance metrics by calculating the score based on the one or more identified performance metrics.

* * * * *